Figure 1:
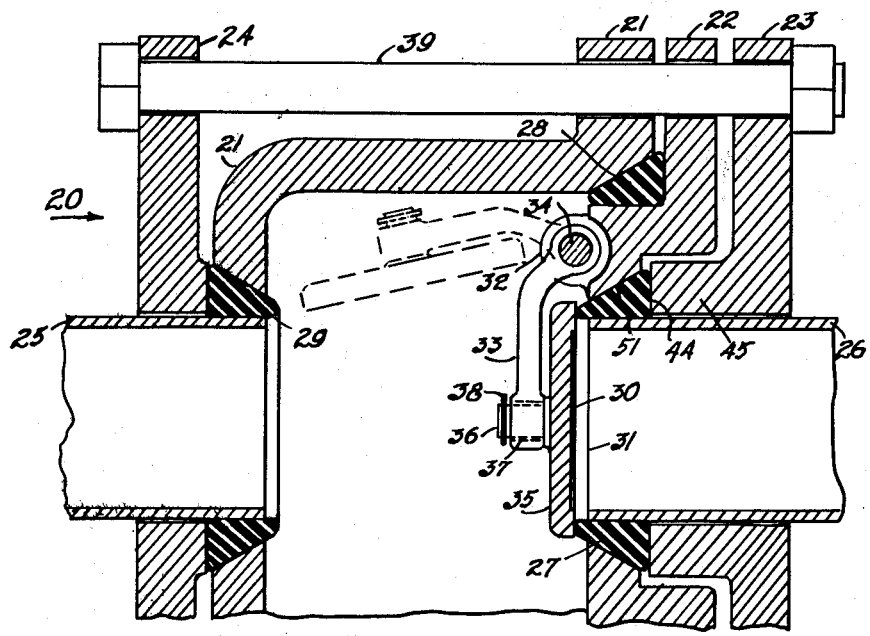

July 24, 1956

D. SILVERMAN 2,756,017

FLUID CONTROL DEVICES

Filed Feb. 25, 1952

3 Sheets-Sheet 1

INVENTOR.

Daniel Silverman

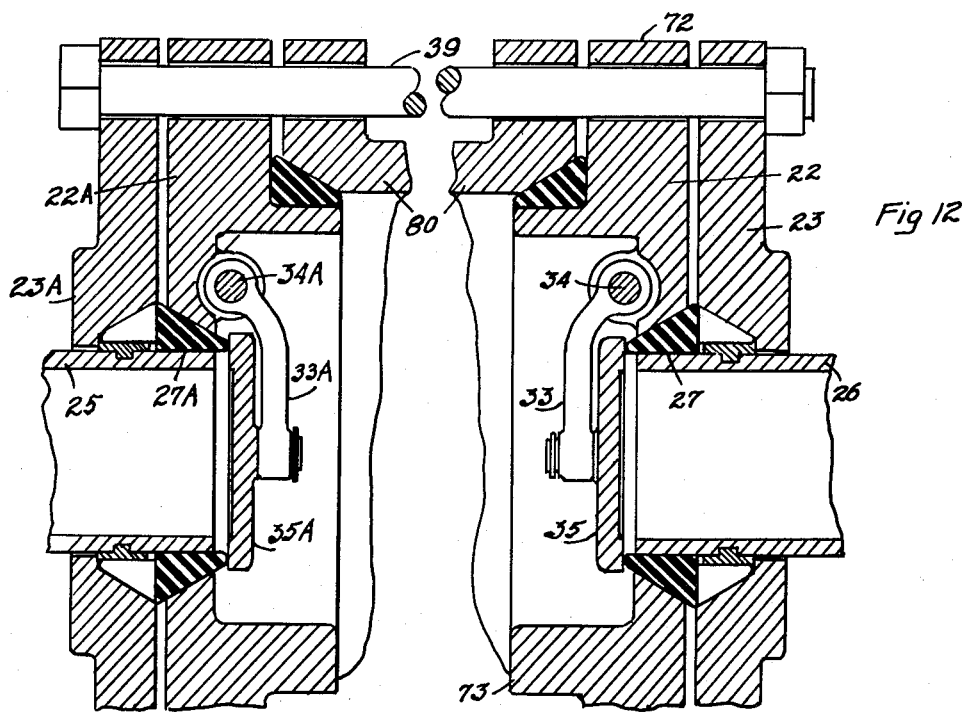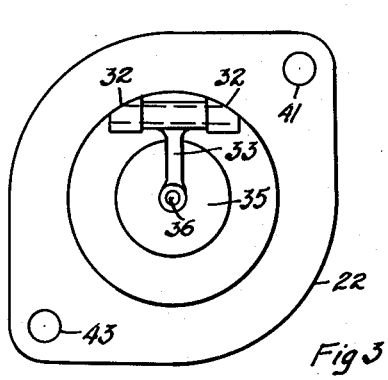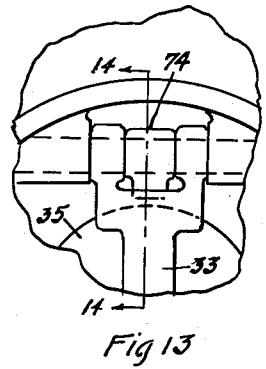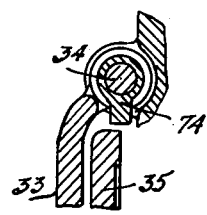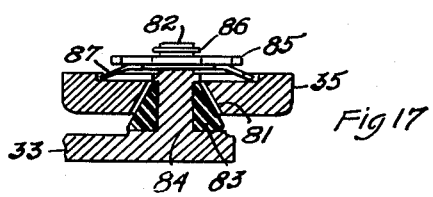

July 24, 1956
D. SILVERMAN
2,756,017
FLUID CONTROL DEVICES
Filed Feb. 25, 1952
3 Sheets-Sheet 3
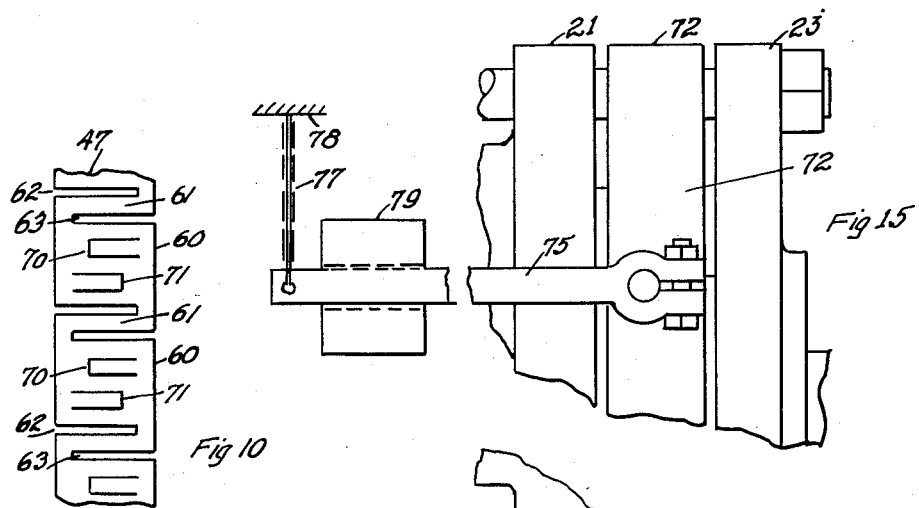
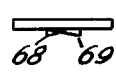
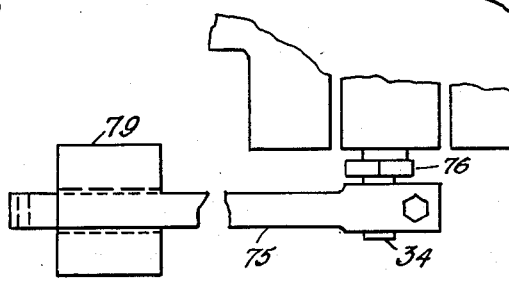
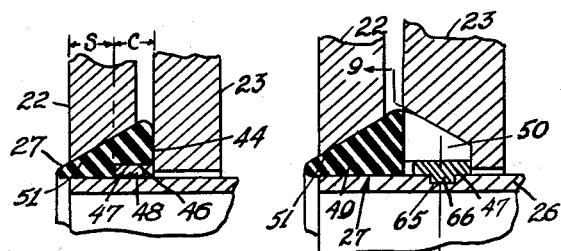
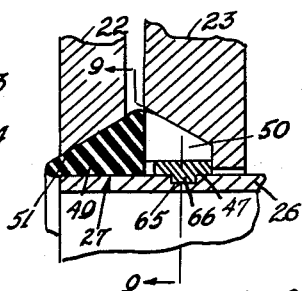
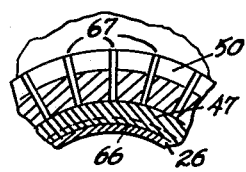
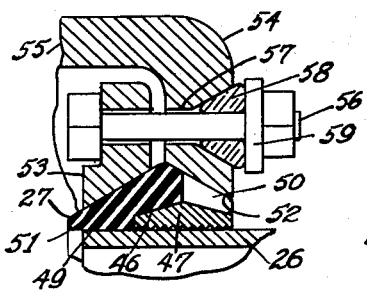
INVENTOR.
Daniel Silverman

United States Patent Office 2,756,017
Patented July 24, 1956

2,756,017

FLUID CONTROL DEVICES

Daniel Silverman, Tulsa, Okla.

Application February 25, 1952, Serial No. 273,287

6 Claims. (Cl. 251—148)

This invention relates to the art of fluid control devices generallly and to check valves and quick closing shut off valves in particular. It relates also to the art of pipe gripping and fluid sealing gaskets.

In the art, check valves for the control of fluids, particularly in the larger sizes and higher pressures have been constructed with heavy cast structures in which the various seats and bearings are machined inside of the chamber of the valve. This type of construction is not only large and bulky, but the machining of internal parts is difficult and costly. Furthermore, the assembly is not readily examined for the precision of fits, and the tolerances of shafts and bearings, and more particularly the fit between the clapper and the clapper seat. Furthermore, these valves generally require the machining of flanges or threaded fittings for joining the valve to the associated pipes or conduits. Also, in order to provide quiet operation, and perfect sealing it is desirable to provide a clapper seat of a deformable plastic material so that it may conform to all the irregularities of the clapper surface. In my invention all of the features of ease of installing the valve into the piping system, the plastic seat for the clapper, and all of the advantages of an open visible assembly is provided by means of a simple and inexpensive structure.

It is therefore an important object of this invention to provide a type of valve structure that is capable of being opened for examination, in which all of the important fits and clearances between moving parts can be examined at close range and in their normal operating position. It is a further object of this invention to provide a type of valve structure that is simple to construct and requires a minimum of machining operations. It is another important object of this invention to provide a type of gasket construction which not only seals the connecting conduits into the valve structure, but provides a deformable plastic seat for the clapper of the valve at the same time. It is also an object of my invention to provide a type of gasket construction that seals a conduit into a chamber body means and also provides a friction element to grip the conduit and prevent relative motion between the conduit and the chamber body means.

In general, these and other objects are accomplished by the use of a tubular gasket made of deformable plastic material which encircles the conduit and in inserted into a correspondingly shaped opening in the valve structure. Dimensions are so determined that when the gasket is clamped between the opening in the valve structure and the conduit by means of a clamping plate, the compression in the deformable gasket forces it tightly against the conduit and the internal surface of the opening to seal those surfaces against fluid leakage. At the same time the inner edge of the gasket or a projecting rim of the gasket is adjusted to project slightly beyond the end of the conduit and beyond the inner surface of the valve structure so that the valve clapper can strike it and seal the opening across the conduit. The internal pressure in the plastic material forces it into intimate contact with the surface of the conduit. This pressure forces the gasket to grip the conduit in fluid sealing locking engagement. Thus the gasket seals against fluid leakage the contact between the gasket and the compressing surfaces, and also provides a high degree of frictional resistance between the gasket and the conduit. Since the gasket has appreciable shear resistance and is rigidly restrained between the valve structure and the clamping plate, the conduit is also restrained, up to the limit of the frictional resistance between the gasket and the conduit, or the shear strength of the gasket material.

My invention contemplates also the step of increasing the frictional resistance between the gasket and the conduit by the use of friction inserts in the inner surface of the gasket, which under the compression in the gasket are forced into intimate contact with the conduit surface. The friction inserts can be of different types, although they generally comprise plates or strips shaped generally to the contour of the conduit, which are forced more closely into the contour of the conduit under the compression in the gasket. They may be made of metal or plastic, or generally of any material having high shear strength. The friction surface can be a prepared surface of the strip, including a multiplicity of sharp hard points which can bite into and grip the surface of the conduit and thus lock the two together so far as relative motion is concerned. If desired, the surface of the conduit can also be prepared or formed, as by machining, roughening, knurling, scoring, grooving or the like, so that with the cooperation of an appropriate surface on the friction insert, the insert and the conduit are positively locked together when they are pressed into intimate contact by the gasket as it is compressed. While conduits and pipes are generally circular in cross section and are so illustrated in the drawings for convenience, they need not be circular, and the type of cast body construction which I prefer permits the use of conduits of any convex, curved or polygonal cross sectional shape.

This will be better understood by reference to the accompanying drawings forming a part of this application and illustrating certain embodiments of my invention. In the different figures of these drawings the same reference numerals are applied to the same or corresponding parts.

Figure 2:
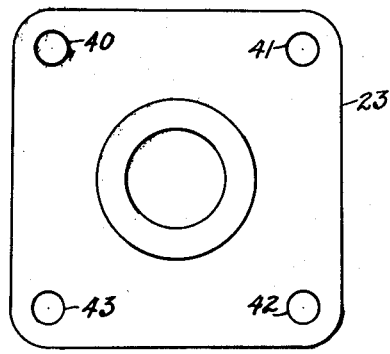
Figure 4:
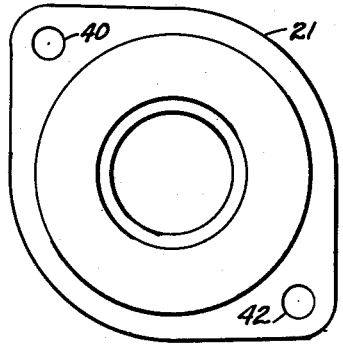
Figure 7:
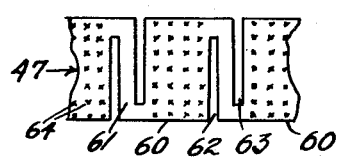

In the drawings:

Figure 1 is a cross sectional view of one embodiment of the improved check valve, Figure 2 is a view of the clamping plate of the valve of Figure 1, Figure 3 is a view of the end plate of the valve of Figure 1, showing the clapper, clapper arm and bearings, Figure 4 is a view of the body portion of the valve of Figure 1, Figures 5 and 6 illustrate two embodiments of the clapper sealing-pipe gripping gasket, Figure 7 illustrates one type of friction insert for use with the gaskets of Figures 5 and 6, Figures 8 and 9 show two views of another embodiment of the clapper sealing-pipe gripping gasket, Figures 10 and 11 illustrate another type of friction insert adapted for use with the type of gasket illustrated in Figures 8 and 9, Figure 12 illustrates, in cross section, an improved embodiment of a combination check valve and manually controlled quick shut off valve for control of fluid flow in two directions, Figures 13 and 14 illustrate an improved construction of clapper arm for a manually controlled quick shut off valve, Figures 15 and 16 illustrate one embodiment of a manually controlled quick shut off valve showing the control arm, and Figure 17 illustrates an improved type of clapper for use in a manually controlled quick shut off valve.

Referring now to the drawings and particularly to Figure 1, one embodiment of my invention is shown. The valve 20 comprises four main parts; a body portion 21, and end plate 22, and two gasket clamping plates 23 and 24. All of these parts may be of cast, forged or machined construction, although I prefer cast construction. Fluid seal between parts 21 and 22, and between them and the two pipes or conduits 25 and 26 is made by means of tapered plastic gaskets 28, 29 and 27 respectively. The valve is shown as joining the ends of two pipes or conduits 25 and 26 separated by a distance sufficient to permit the swinging of the clapper on the clapper arm (into the upper dotted position). In the assembly of the valve, clamping plate 23 and gasket 27 are slipped over the end of the pipe 26. There are preferably no threads on the outer surface of the pipe, which is smooth at the area of seat or contact of the gasket so that an intimate fluid sealing contact can be provided between the inner surface of the gasket 27 and the pipe 26, and between gasket 29 and pipe 25. The positioning of the gasket 27 on the pipe 26 is such that the inner edge or rim 30 of the gasket overhangs the end 31 of the pipe. Thus when the clapper closes the valve and blocks off the cross section of the pipe it strikes the rim of the plastic gasket, and will not strike the pipe. This provides for quiet operation, long life and for more complete sealing of the fluid. The gasket material can be chosen so as to be unaffected by the particular fluids in the system, and pliable enough to form a perfect seal between the clapper and the gasket under only slight pressure. Rubber or some of the rubber like synthetic plastic materials may be used for the gasket.

The end plate 22 carries a central opening which has an inner surface 51 shaped substantially to fit the outer surface of the gasket 27. I prefer this to be a tapered surface which may comprise substantially a right circular cone, but there is no limitation on the shape of this surface. It may comprise any desired cross sectional shape, perpendicular to the axis of the pipe, and any desired relationship between radius to the surface and distance along the axis of the pipe, so long as the surface is generally tapered. The preferred direction of taper is such that the gasket can be inserted into the end plate from the outside of the valve, although this is not a necessary requirement. The dimension of the central opening at the inner surface of the end plate must be such that the gasket rim projects inward beyond the inner surface of the plate, so as to expose the gasket edge 30 to the clapper.

The gasket 27 is compressed between pipe 26 and plate 22 by means of the clamping plate 23 which is pressed against the gasket by means of bolts, not shown. When these bolts are tightened the gasket is compressed and grips the pipe, which is thus securely locked in place in the end plate 22, and the opening is completely sealed against fluid leakage.

The end plate 22 carries on its inner surface bearings 32, Figure 3, which support the clapper arm 33 by means of shaft 34. The clapper arm carries the clapper 35 by means of the post 36 which passes through the oversize opening 37 in the end of the clapper arm. This loose fit is provided so that the clapper can not only rotate in the course of its operations and so adjust the wear on the sealing surface, but it can assume any necessary small angle with the axis of the hole 37 so as to properly fit and seat on the gasket in case the plane of the gasket is not perpendicular to the axis of the hole. End play between the clapper and the clapper arm is provided, and the clapper post is locked by some means such as the lock ring 38 which fits into an appropriate groove near the end of the post 36. In operation, the clapper and clapper arm can be raised to the position shown in dotted outline in the upper part of the chamber so that a clear opening through the valve is provided.

When parts 22 and 23 are assembled together on the end of the pipe 26 and the clapper is lowered against the rim 30 of the gasket, the fit of the clapper against the gasket is readily observed, since the eye can be placed in the plane of the sealing surface of the clapper. When this fit is satisfactory, parts 24, 29 and 21, having previously been slipped over the end of the pipe 25 are drawn into position such that part 21 presses against gasket 28 and part 24 presses against the end of gasket 29 compressing it between the outer surface of pipe 25 and the center opening of part 21.

In the embodiment illustrated, four bolts 39 are provided to hold the assembly together. In Figure 2, the face view of the clamping plate 23 will provide substantially a square appearance, with four bolt holes, 40, 41, 42 and 43, in the respective corners. Clamping plate 24 is not illustrated, but it is similar to the illustration of Figure 2 and has the same four bolt holes. Part 22 is illustrated in Figure 3 and part 21 in Figure 4. They each have two opposite bolt holes, 41 and 43 in part 22, and holes 40 and 42 in part 21. In the assembly of the valve, parts 22 and 23 are bolted together by short bolts through the two bolt holes 41 and 43. Then, when part 21 is assembled against gasket 28 it is bolted to plate 23 by means of bolts through its two holes 40 and 42. These two bolts are arranged at opposite corners from those holding parts 22 and 23 together, and there is no interference between them. When parts 22, 21 and 23 are thus clamped solidly together, the bolts holding parts 22 and 23 can be loosened and removed. Long through bolts 39 can then be placed through these two holes 41 and 43 and through the corresponding holes of clamping plate 24. After these are tightened, the two bolts holding 21 and 23 together are removed and two additional long bolts are threaded through the corresponding holes in plates 23 and 24 to thoroughly secure the entire assembly. Other means of clamping together the various parts of the valve assembly will occur to one skilled in the art, and may be used without departing from the spirit of my invention.

In the use of gasket 27, internal compression forces the plastic material into intimate contact with the end plate 22 and the pipe 26. The internal compression may be made greater than the fluid pressure inside of the check valve, and thus there is no fluid leakage from the valve along the surfaces of the gasket. Also, because of the frictional character of the plastic material of which the gasket is fabricated, there is considerable resistance to motion of the pipe along the surface of the gasket while the gasket is in compression. Consequently, any movement of the pipe 26, for example, to the right in Figure 1, tends to carry with it the gasket 27, which is restrained by the clamping surface 44 of the central boss 45 of plate 23. If the force tending to move the pipe is great enough, the friction between the gasket and the pipe surface may not be sufficient to prevent relative motion. In that event some additional friction is required.

Figure 5 indicates an embodiment which provides this additional restraint. In this figure the gasket 27, has an annular recessed portion 46 which contains an insert 47 comprising a strip, plate or annular ring, or a portion or portions of a ring. This insert 47 may be of metal, plastic or other material having high shear strength and may have points or teeth 48 facing inwardly, in a position to contact and grip the pipe. This insert may be of sufficient thickness radially so that it directly contacts the clamping surface 44 of clamping plate 23. Under the compressive stress in the plastic gasket 27 there is a radially inward pressure of the gasket on the insert 47, which forces the sharp points 48 into the surface of the pipe 26. Thereafter any force on the pipe tending to carry it to the right will be transferred to the insert 47 and thus directly to the clamping plate 23.

The latter is restrained by bolts 39 to the corresponding plate 24 on the other end of the valve. Pipe 25 is restrained by a similar insert pressed into contact with its surface by pressure of the gasket 29. Thus there can be no outward movement of the pipes 25 and 26.

The embodiment of gasket 27 in Figure 5 comprises two portions, a seal zone S and a clamp zone C. The former is for the purpose of sealing the valve against fluid leakage, and the latter serves to grip the pipe. These same two features can be provided in a different structure, as shown in Figure 6, in which the gasket 27 comprises two tapered portions. One end 49 of the gasket is tapered to fit the opening 51 in the center of plate 53, and serves to seal the contact between the gasket 27 and pipe 26 against fluid leakage. The other tapered portion 50 is shaped to fit a correspondingly tapered opening 52 in the center of plate 54. This portion 50 of the gasket has the annular recess 46 which contains the friction insert 47 along at least a portion of its inner surface. While this friction insert means is illustrated as a hardened curved strip or open ring with sharp hard points or teeth facing inwardly, and the strip or ring curved to the contour of the pipe, it can be of any desired type. For example, this insert 47 can be a strip of metal, preferably of the same material as the pipe, but if desired can be of steel, brass, bronze, aluminum, plastic or any other compliant material of substantial shear strength capable of being formed generally to fit the contour of the pipe. The inner surface of the strip can be machined to provide any desired contour, or it can be smooth and coated with a material which provides a multiplicity of hard sharp points. This can be a plurality of particles, such as crushed hardened steel balls or shot, or hard mineral particles, crushed to provide irregular shapes and hard sharp corners. Or it might comprise a strip of material on which is deposited by well known flame depositing methods, a multiplicity of small droplets, of hard metal, which attach themselves to the surface of the strip. The sharp particles might also be attached to the strip in a temporary fashion by means of an adhesive. The strip is then placed around the pipe. The gasket 27 is slipped over the pipe with the portion 50 surrounding the strip. As the plate 53 is pressed more and more tightly against the gasket, the latter is squeezed between the plate 53, pipe 26 and plate 54. This internal pressure forces the hard particles into both the pipe surface and inner surface of the strip, thus acting as tiny dowels locking them together, so far as their relative movement is concerned. As will be explained more fully in connection with Figures 8 and 9, a plurality of longitudinal radial slots are provided in the portion 50 of the gasket in order to permit enlargement of the end portion to insert and remove the insert 47.

In Figure 6 I have shown another shape of gasket insert 47, which provides advantages as regards the application of pressure to force it into contact with the pipe. The portion 50 and part of portion 49 of gasket 27 bear against the friction insert 47. The two portions of the gasket, 49 and 50 are compressed as the plates 53 and 54 are drawn together by bolts 56. The insert 47 is tapered in two directions as shown, so that when it is forced to the right due to movement of the pipe to the right, it creates a greater compression in the gasket portion 50 and so is forced more firmly into contact with pipe 26. When the pipe is forced to the left it tends to carry with it the insert 47. The other tapered portion of the insert bearing against the portion 49 of the gasket serves again to create a greater pressure in the gasket and therefore a greater force on the strip, forcing it more firmly into contact with the surface of the pipe.

While I have shown in Figure 6 that the inner portion 49 of the gasket 27 is sealed against the pipe 26 by means of the pressure of plate 53, and that the outer portion of the gasket 50 is locked to the pipe 26 by means of insert 47, and sealed against the surface 52 of plate 54, it will be clear that this arrangement can be varied quite widely. For example, the plate 54 may have an extension, portion 55, which indicates that it could be the end wall and body of chamber portion 21, and the plate 53 could be a clamping ring which is used solely for the purpose of sealing the gasket 27 against the pipe. This is accomplished by means of the bolts 56 which are sealed through the wall of the chamber through openings 57 by means of the tapered gaskets 58 clamped against the washers 59. It is thus seen that the opening through the end wall of the chamber need not necessarily be tapered inwardly, but can be tapered outwardly, or not tapered at all, in which case the gasket 27 would seal against the inner face of the end wall.

Figure 7 shows another possible embodiment of the strip 47. This comprises short body portions of strip material 60 attached to each other by means of narrow links 61, separated from the body portions by means of two cuts 62 and 63. This type of construction permits relative motion of the body portions with respect to each other, as is required if the strip 47 is to intimately contact the pipe. As pressure of the gasket forces it closer and closer into contact with the pipe, and therefore to a smaller and smaller radius, its perimeter must contract. One surface of the body portions 60 is coated with the hard particles 64 mentioned above, and the strip is bent or rolled into a cylindrical form slightly larger than the outer surface of the pipe, with the particles on the inner surface. This cylinder is then slipped into the recess 46 of the gasket 27 and the latter is ready to use.

In applications where a still more positive clamping between the pipe and the valve is required to prevent relative motion in either direction between the pipes 25 and 26 and the valve 20, the pipe surface may be prepared or formed by machining, roughing, scoring, knurling, grooving, etc. For example, some such means as that indicated in Figures 8 and 9 might be provided. In this embodiment a shallow groove 65 is cut into the outer surface of the pipe. A cylindrical strip or open ring 47 is provided that has a ridge or projection 66 on its inner surface which is arranged to fit into the groove 65. This ring 47 is normally of a diameter large enough for the ridge 66 to fit over the surface of the pipe, but under the pressure of the compressed portion 50 of gasket 27 the ring is compressed and the ridge is forced into the groove 65 and held there, thus rigidly locking the ring to the pipe. The ring 47 transmits the force of the pipe to the plate 23 on one side, or to the gasket 27 on the other, thus positively locking the pipe to the valve. In order to facilitate removal of the ring 47, which has to expand in order to be lifted out of the groove 65, the portion 50 of the gasket 27 can be cut, slotted or molded with a multiplicity of longitudinal radial slots 67 as shown in Figure 9. These slots will not seriously affect the compression of the gasket, and they permit the ready expansion of the portion 50 of the gasket in order to release the insert. The insert need not be a complete ring, but may be one or more portions of a ring.

If the forming or modification of the surface of the pipe includes the cutting of notches, grooves, or the like, the ring may be constructed as shown in Figures 10 and 11. This has the general form of the strip or ring of Figure 7, but has, in addition, projections 68 and 69 on the inner surface, designed to be pressed into corresponding cuts, grooves or depressions in the surface of the pipe. These projections may be formed for example, by means of die cuts 70 and 71. The tongue portions are bent downward to provide the necessary edges 68 and 69 extending below the internal surface of the ring 47. The strip is formed into a circular ring large enough to clear the outer diameter of the pipe and is inserted into the relieved portion 46 of the gasket. As the gasket is compressed it forces the strip to conform more closely to the contour of the modified surface of the pipe, thus forcing the projections into the depressions in the surface of the pipe.

A valve assembly using this general principle of locking the pipes to the valve is illustrated in Figure 12 in cross section. In this figure an alternative construction of the end plate 22 is shown over that of Figure 1. In this design, the end plate is provided with a thick flange 72 through which it is possible to bring out shaft 34 through a packing gland to a control lever (see Figures 15 and 16). Since this construction brings the boss 73 out (to the left) beyond the plane of the gasket edge 30 it is not quite as simple (as the embodiment of Figure 1) to see the fit of the clapper with the gasket. However, the structure is still open enough so that a satisfactory examination can be made to determine the proper adjustment of the clapper and the gasket.

Figures 13 and 14 show a portion of the construction of the clapper arm 33 and the shaft 34. Shaft 34 carries an operating arm 74 which is securely fastened to the shaft 34. The clapper arm 33 is loosely fitted to the shaft 34, permitting free rotation. Thus with the operating arm 74 in the downward position as shown, the clapper arm is free to turn and lift the clapper 35 into the upper portion of the valve chamber, and so permits operation of the valve as a true check valve.

With fluid movement from the left, in Figure 12, the valve would close and remain closed. However, if the shaft 34 is turned clockwise, the operating arm 74, which locks under the clapper arm 33, lifts the arm 33 and the clapper 35 and holds them in the upper position in the valve chamber, and so keeps the valve open.

The shaft 34 can be turned by means of the lever arm 75 (Figures 15 and 16) which is attached to an extension of the shaft 34, which passes through a packing gland and packing nut 76. If the lever 75 is lifted, it turns shaft 34 clockwise and so opens the valve. If the valve is to be kept open it is necessary to restrain the lever 75 in the upper position by means of a tension member 77 which is supported from bracket 78, attached to the body of the valve. This tension member 77 can be fusible link, which can weaken under advanced temperature and so permit the lever 75 to rotate counterclockwise under the influence of weight 79, and so close the valve. Or the tension member can be a remotely controlled means to release the lever 75 permitting it to fall and close the valve.

With this type of operation the valve becomes a quick closing positive shut off valve which can be inserted into a fluid system to act as a safety means in the event of the failure of a critical part of the system. Also, the valve with the operating lever 75 can be used as a manually controlled valve which is opened (against fluid flow) by manual means, and stays open so long as the arm 75 is held in the upper position. It thus becomes possible to provide a type of construction in which an elongated cylindrical body section 80 of the valve is used, as shown in Figure 12, which cooperates with two end plates 22 and 22A, two gaskets 27 and 27A, two clappers 35 and 35A, and corresponding clapper arms 33 and 33A, two operating shafts 34 and 34A and levers 75. This permits full flexibility of operation, as a check valve for flow in either direction, or as a quick shut off control valve to shut off flow in either or both directions.

In the event of the use of this valve as a quick shut off valve, it is necessary to open the valve against the flow of the fluid tending to maintain the clapper in contact with the gasket. In order to equalize this pressure on both sides of the clapper and so minimize the force required to open the valve, I show in Figure 17 an embodiment which provides a small pilot opening 81 in the clapper 35, which requires a minimum of force to open against the fluid pressure. When the pilot opens, it permits the pressure on both sides of the clapper 35 to equalize and so permits opening of the valve and lifting of the clapper. In this embodiment I provide a post 82 on the end of the clapper arm, which carries a tapered gasket 83. This is preferably locked on the post by some such means as the recess 84. A corresponding opening 81 is provided in the clapper 35 which seats against the gasket 83. The clapper is held on the post 82 by means of a perforated spider 85 which is itself held on the post by means of a retaining ring 86 which is fitted into an appropriate groove near the end of the post. A perforated spring disk 87 tends to hold the clapper tightly against the seat gasket 83 until the clapper arm is rotated, tending to pull the post and gasket out of the opening 81 in the clapper.

While I have described my invention in terms of the foregoing specific embodiments and modifications, it is obvious that many further embodiments and modifications are possible and will occur to those skilled in the art. For example, the clamping plates 23 and 24 of Figure 1 can be permanently attached to the corresponding pipes 26 and 25, such as by welding. Furthermore, the clapper sealing gasket 27 can be used in the conventional type of check valve to provide a compliant seat for the clapper. This can be done by providing a tubular extension of the pipe 26 which the gasket encircles and a ring such as 53 of Figure 6 encircling the gasket, which can be tightened about the gasket to compress it, and force it to grip the pipe extension. In this case the gasket need not be tapered, but can be of any shape adapted to be compressed by the encircling ring. If desired, the ring which compresses the gasket to grip the pipe can also support the clapper, as does part 22 of Figure 1, although that is not necessary, and the clapper can be mounted to another support inside of the valve chamber.

It is clear therefore that the scope of my invention should not be considered as limited to systems with the exact details described, but is rather to be ascertained from the scope of the appended claims.

Having described my invention, what I claim as new and desire to secure by Letters Patent is:

1. In a check valve adapted to connect the two spaced ends of two conduits, the improvement comprising, a deformable plastic gasket adapted to encircle, to be adjustably positioned along and project beyond the end of at least one of said conduits, said plastic material being adapted to exert substantial frictional resistance to movement along said conduit, clapper means adapted to seat on said projected end of said gasket, chamber body means enclosing said clapper and said gasket, and means for compressing said gasket and forcing it to grip said conduit and said chamber body means in fluid sealing contact, said gasket being the sole means for fluid seal between said conduit and said chamber body means.

2. In a check valve with cast chamber body means connected to a conduit which projects into said chamber body means, a clapper sealing means comprising, a deformable plastic gasket, adapted to encircle, to be adjustably positioned along and to overhang the end of said conduit, said plastic material being adapted to exert substantial frictional resistance to movement along said conduit, means encircling said gasket for compressing said gasket to force it to grip said conduit in fluid sealing contact, and to retain said conduit in its position in said chamber body means, said gasket being the sole means for fluid seal between said conduit and said chamber body means, and clapper means hingedly mounted in said chamber and adapted to seal against said overhanging portion of said gasket.

3. In a valve, a seat structure for a closure means adapted to contact said seat and to seal the contact area thereof, comprising a wall of said valve, an opening in said wall, a tube inserted into said opening and extending inwardly beyond said wall, a gasket of deformable plastic material encircling said tube and extending beyond the exposed end of said tube, said gasket being adapted to exert substantial frictional resistance to movement along said tube, and clamping means encircling said tube and compressing said gasket to force said gasket to grip said tube and said wall in fluid sealing contact, said tube being substantially longitudinally uniform in external contour over the region in which seal is made between said gasket and said tube, said gasket being the sole means for fluid seal between said tube and said wall.

4. In a shut off valve having chamber body means including a wall, the improvement comprising an opening in said wall, a conduit inserted into said opening and extending inwardly beyond said wall, a deformable plastic gasket which encircles said inwardly projecting portion of said conduit, and extends beyond the end of said conduit, said gasket also bearing against the inner surface of said opening in said wall, clapper means hingedly mounted in said chamber body means for sealing against the overhanging portion of said gasket, externally operable means for lifting said clapper, and means for compressing said gasket to seal against fluid leakage its contacts with said conduit and said wall, said conduit being substantially uniform in cross-section throughout the longitudinal region in which fluid seal is made between said conduit and said gasket, said gasket being the sole means for fluid seal between said conduit and said chamber body means.

5. In a check valve including a chamber, a fluid sealing clapper hinged therein, an end wall of said chamber, an opening in said end wall and a tubular conduit inserted therein, said conduit being of substantially uniform cross-section over the portion inserted into said chamber, the improvement comprising the inner surface of said opening generally tapering, the space between said surface and said conduit occupied by a correspondingly tapered portion of a tubular deformable plastic gasket which encircles said conduit and extends inwardly beyond the end of said conduit, forming a seat for said clapper, and means for compressing said gasket into said space, whereby fluid sealing contact between said gasket, said surface and said pipe is effected, said gasket being the sole means for fluid seal between said conduit and said end wall.

6. In a check valve including a housing with an end plate, the improvement which comprises an opening in said plate with its internal surface in substantially the form of a right circular cone, tapering toward the inside of said housing, a circular pipe of constant diameter inserted into said opening and extending inwardly beyond said plate, the space between the conical surface of said opening and the outer surface of said pipe being occupied by a tubular deformable plastic gasket, a portion of which is tapered to correspond to the taper of said surface, a portion of said gasket extending inwardly beyond the end of said pipe thereby forming a seat for the clapper of said valve, a clapper hingedly mounted in said housing and adapted to contact said seat, externally operable means for lifting said clapper from said seat, and means for compressing said gasket into said space to grip said pipe and to seal against fluid leakage the contact surfaces of said gasket, said pipe, and said opening, said gasket being the sole means for fluid seal between said pipe and said plate.

References Cited in the file of this patent

UNITED STATES PATENTS

| | | |
|---|---|---|
| 141,747 | Armstrong | Aug. 12, 1873 |
| 391,079 | Rinker | Oct. 16, 1888 |
| 559,884 | Birkery | May 12, 1896 |
| 810,746 | Hadley | Jan. 23, 1906 |
| 930,386 | Kiefer | Aug. 10, 1909 |
| 1,086,549 | Miller | Feb. 10, 1914 |
| 1,147,292 | Benson | July 20, 1915 |
| 1,193,958 | Youngs | Aug. 8, 1916 |
| 1,875,591 | Green | Sept. 6, 1932 |
| 2,251,414 | Neal | Aug. 5, 1941 |
| 2,423,771 | Gould | July 8, 1947 |
| 2,451,354 | Uhls | Oct. 12, 1948 |
| 2,455,202 | Ware | Nov. 30, 1948 |
| 2,463,235 | Andrews | Mar. 1, 1949 |
| 2,470,800 | Ashton | May 24, 1949 |
| 2,508,914 | Graham | May 23, 1950 |
| 2,520,092 | Fredrickson et al. | Aug. 22, 1950 |
| 2,562,359 | Iredell | July 31, 1951 |

FOREIGN PATENTS

| | | |
|---|---|---|
| 3,146 | Great Britain | 1864 |